United States Patent [19]

Lang

[11] Patent Number: 4,689,734

[45] Date of Patent: Aug. 25, 1987

[54] HIGH-VOLTAGE DIRECT-VOLTAGE SOURCE

[75] Inventor: Ernst Lang, Würenlingen, Switzerland

[73] Assignee: BBC Brown, Boveri & Company, Limited, Baden, Switzerland

[21] Appl. No.: 872,894

[22] Filed: Jun. 11, 1986

[30] Foreign Application Priority Data

Jun. 28, 1985 [CH] Switzerland .......................... 2765/85

[51] Int. Cl.$^4$ ............................................. H02M 3/18
[52] U.S. Cl. ...................................... 363/59; 363/126; 320/1
[58] Field of Search ...................... 363/53, 59, 84, 126; 320/1; 307/110

[56] References Cited

U.S. PATENT DOCUMENTS

| | | | |
|---|---|---|---|
| 3,681,672 | 8/1972 | Strauss | 307/110 X |
| 4,329,595 | 5/1982 | Watson | 320/1 X |
| 4,451,743 | 5/1984 | Suzuki et al. | 363/59 X |
| 4,467,248 | 8/1984 | Watanabe et al. | 320/1 X |

Primary Examiner—Patrick R. Salce
Assistant Examiner—Marc S. Hoff
Attorney, Agent, or Firm—Burns, Doane, Swecker & Mathis

[57] ABSTRACT

The high-voltage direct-voltage source is composed of a bank of high-voltage capacitors and a charging circuit for charging the capacitors. A monitoring unit is connected in parallel with at least one of the high-voltage capacitors. After a predetermined limit value of the charging voltage has been exceeded, this monitoring unit emits a signal to a control device of the charging circuit preventing the further charging of the bank. The input of the monitoring unit is formed by a resistive voltage divider comprising a high-voltage-side and a low-voltage-side resistor.

A high-voltage direct-voltage source is to be created in which a dielectric overloading of the high-voltage capacitors can be avoided in a simple manner which is insensitive to electric disturbances. This is achieved by the fact that the high-voltage-side resistor of the resistive voltage divider consists at least partially of non-linear voltage-dependent resistance material.

Such a high-voltage direct-voltage source can be used, for example, in high-voltage direct-voltage transmission systems or in circuits for the synthetic testing of high-voltage circuit breakers.

3 Claims, 1 Drawing Figure

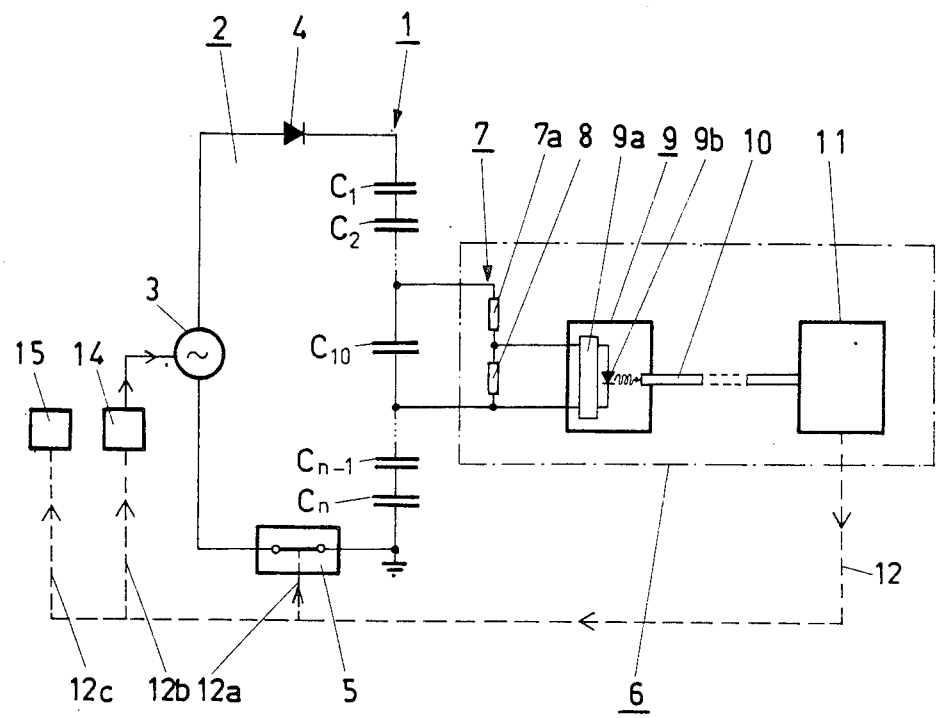

HIGH-VOLTAGE DIRECT-VOLTAGE SOURCE

The present invention relates to a high-voltage direct-voltage source. More particularly, the present invention relates to a high-voltage source including a bank of high-voltage capacitors, a charging circuit for charging the bank of capacitors, and a monitoring unit for controlling the charging of the bank of capacitors.

BACKGROUND OF THE INVENTION

From Patent Specification DD No. 205 039, a generic high-voltage direct-voltage source is known which can be used in high-voltage test engineering. It consists of a battery of high-voltage capacitors which are charged up via a charging circuit. The charging circuit contains an alternating-voltage supply source, a rectifying arrangement and a switching device in series with the capacitor bank. A part of the high-voltage capacitors is grounded on one side and a monitoring unit is connected in parallel with each of these high-voltage capacitors grounded on one side, which unit emits a signal after a predetermined limit value of the permissible charging voltage for the high-voltage capacitors has been exceeded. This signal then acts on a control device which prevents further charging of the capacitor bank. Each of the monitoring units has at its input a resistive voltage divider 7 the low-voltage-side resistance of which is grounded on one side and is connected in parallel with one limit-value detector in each case. The limit-value detector is effectively connected to an evaluating unit which forms the output of the monitoring unit.

In this high-voltage direct-voltage source, voltages proportional to the charging voltage at the high-voltage capacitor are tapped off at the input of the respective monitoring unit. This proportionality is maintained even in the range of the permissible limit value of the charging voltage. Thus, small voltage rises due to electric disturbances which are possible at any time in high-voltage test engineering can lead to an unnecessarily early response by the limit-value detector.

BRIEF SUMMARY OF THE INVENTION

The present invention is intended to remedy this defect in these type sources. The present invention achieves the object of creating a high-voltage direct-voltage source in which a dielectric overloading of the high-voltage capacitors can be avoided in an inexpensive and simple manner which is particularly insensitive to electric disturbances.

The advantages achieved by the invention can be essentially seen in the fact that each high-voltage capacitor can be protected against dielectric overloading, independently of its potential, and that the risk of forming faulty signals is reduced. In addition, it is easily possible to monitor several high-voltage capacitors separately at the same time and thus to achieve an effective redundance of protection with comparatively little effort. Preferably, a limit-value sensor emits a light signal which is transmitted to an evaluating unit through a fiber optic connection.

BRIEF DESCRIPTION OF THE DRAWING

In the text which follows, the present invention is explained in greater detail with the aid of a drawing which illustrates a preferred embodiment of the high-voltage direct-voltage source according to the present invention.

DETAILED DESCRIPTION OF THE PREFERRED EMBODIMENT

In the FIGURE, a bank 1 of series-connected high-voltage capacitors $C_1 \ldots C_n$ is shown. The individual high-voltage capacitors $C_1$ to $C_n$ can also consist in each case of a plurality of parallel-connected capacitors. The bank 1 is charged with direct voltage by a charging circuit 2. The charging circuit 2 consists of the series circuit of an alternating voltage supply source 3 comprising a rectifying arrangement 4 and a switching device 5. A monitoring unit 6 is connected in parallel with the high-voltage capacitor $C_{10}$ or with one of the capacitors which, in their totality are connected in parallel with capacitor $C_{10}$.

In this monitoring unit 6, a resistive voltage divider 7 is connected in parallel with the high-voltage capacitor $C_{10}$ at the input. The voltage divider 7 consists of a high-voltage-side resistor 7a and a low-voltage-side resistor 8 which is connected in series with the former. The resistors 7a and 8 are matched to each other in such a manner that an electric voltage-proportional measurement signal can be tapped off across the resistor 8, which signal is introduced to the input of a limit-value detector 9. The limit-value detector 9, which contains an electronic assembly 9a, into the output circuit of which a light-generating element 9b is connected, monitors the electric measurement signal and converts it into a light signal in its output circuit after a predetermined limit value has been exceeded. The power needed for this conversion and for operating the limit-value detector 9 is supplied by the electric measurement signal itself. The light signal is transmitted via an optical wave guide 10 to an evaluating unit 11 and is there reconverted into an electric signal. This electric signal represents the output signal of the monitoring unit 6, the feedback possibilities of which are indicated by the action line 12 and its branches 12a, 12b, 12c. Branch 12a can be used for actuating the switching device 5. Branch 12b can be used for exciting a control unit 14 to act on the regulation of the supply source 3 in such a manner that the charging voltage is regulated down to the permissible value. In addition, it is also possible to operate only a display unit 15 via branch 12c.

But it is also conceivable that the measurement signal is processed in various ways in the limit-value detector 9, and the various output signals are transmitted separately from each other in separate transmission channels into the evaluating unit 11 and are there reconverted into electric signals which can trigger various functions independently of each other.

The FIGURE will be considered in closer detail to explain the operation of the invention. The alternating-voltage supply source 3 supplies the power for charging the bank 1 of high-voltage capacitors $C_1 \ldots C_n$. The charging voltage is rectified in the rectifying arrangement 4. The switching device 5 can be used for interrupting the charging circuit 2. The bank 1 of high-voltage capacitors $C_1 \ldots C_n$ is charged, for example for a few minutes, with the rectified charging voltage. As soon as the desired final value of the charging voltage has been reached, the supply source 3 is completely disconnected from the bank 1 by a disconnector, not shown. The charged bank 1 can then be used, via connections and connecting devices, not shown, as an independent high-voltage direct-voltage source, for example, for the synthetic testing of high-voltage circuit breakers.

If the bank 1 is designed incorrectly, which would be the case, for example, if the sum of the nominal voltages of the series-connected high-voltage capacitors $C_1 \ldots C_n$ were smaller than the intended charging voltage for the total bank 1, the high-voltage capacitors $C_1 \ldots C_n$ would be dielectrically overloaded. Such overloading can also occur in a correctly dimensioned bank 1 if, for example, a high-voltage capacitor has an internal short circuit and cannot take up its share of the charging voltage, so that this share has to be proportionally taken over by the remaining high-voltage capacitors. In addition, circuits of the bank 1 are also possible in which smaller charging voltages are to be used, so that right from the start fewer high-voltage capacitors, for example only $C_1 \ldots C_{n-5}$, are connected in series, and that these are accidentally charged with the full charging voltage possible from the charging circuit 2, which can lead to considerable defects in the overloaded high-voltage capacitors.

The high-voltage capacitor $C_{10}$ or one of the high-voltage capacitors which, in their totality, are connected in parallel with $C_{10}$, is then monitored by the monitoring unit 6 to prevent it from being overloaded. If all high-voltage capacitors $C_1 \ldots C_n$ are equal, only one of them needs to be monitored. If different types of capacitors are to be connected together in the bank 1, each type of capacitor must be separately monitored. In addition, it is recommended to analyze all possibilities of connecting the bank 1 so that high-voltage capacitors, which are particularly at risk, can be protected in time. As a monitored high-voltage capacitor, the one used in each of the possible circuit variants of the bank 1 is advantageously to be used.

In parallel with the high-voltage capacitor $C_{10}$ to be protected in the monitoring unit 6 a voltage divider 7 is connected, across whose low-voltage-side resistor 8 the electric measurement signal proportional to the charging voltage of the high-voltage capacitor $C_{10}$ is tapped off. This measurement signal is monitored in the limit-value detector 9 and converted into a light signal after the predetermined limit value has been exceeded. The limit value detector 9 contains the electronic assembly 9a in the output circuit of which the conversion into the light signal takes place in the light-generating element 9b, for example in a light-emitting diode. However, the limit-value detector 9 can also consist of only a gas-filled overvoltage arrester with a glass housing, the responding arc of which then serves as a light signal.

The light signal is advantageously transmitted in an optical wave guide 10 into the evaluating unit 11. In this manner, interfering influences from other optically visible discharges such as, for example, corona discharges and other sparks, are excluded, as are electromagnetic influences. For example, it would also be conceivable to transfer the light signal via an air gap, but in this case the light signal would have to be modulated to achieve a comparable freedom from interference. The potential isolation achieved by the light transmission path has a very advantageous effect, since, as a result, any high-voltage capacitor can be monitored, completely independently of its potential situation. In addition, it is advantageous that the power needed for processing the measurement signal in the limit-value detector 9 is supplied by the measurement signal itself, so that no elaborate and expensive power transmission systems are needed for supplying the limit-value detector 9 which is at high-voltage potential.

In the evaluating unit 11, the light signal is reconverted into an electric signal. This electric signal can drive, for example, the switching unit 5 which then automatically interrupts the charging circuit 2 and thus prevents further overloading of the high-voltage capacitors $C_1 \ldots C_n$. But it can also be used for actuating the control unit 14 which acts on the alternating-voltage supply source 3 and automatically regulates the charging voltage back to harmless values. It can also be meaningful to use a signal for displaying the charging condition of the high-voltage capacitors $C_1 \ldots C_n$ in order to achieve, for example, that the operating personnel is urged to increased attention by means of the lighting up of a control lamp shortly before the final value of the charging voltage is reached.

In this manner it can be automatically ensured that no overloading of the high-voltage capacitors $C_1 \ldots C_n$ is possible. The synthetic testing of high-voltage circuit breakers is simplified and the operational reliability of the test system is enhanced. Since this monitoring of the bank 1 can be performed with simple means, adequate redundancy of the protection, and a certain selectivity, can be achieved without great effort by multiplying the measuring points.

A particularly strong electric measurement signal can be picked up across the low-voltage-side resistor 8 of the voltage divider 7 if its high-voltage-side resistor 7a consists at least partially of non-linear voltage-dependent metal oxide varistor material. If the varistor is designed in such a way that it becomes more conductive just when the high-voltage capacitor has reached its nominal voltage, the value of the electric measurement signal across the low-voltage-side resistor 8 is at the same time superproportionally increased. In this way, the limit value in the limit-value detector 9 can be selected to be distinctly above the normal values so that the risk of forming faulty signals is significantly reduced.

The limit-value detector 9 can also contain a galvanometer-like device comprising a mirror which is moved in dependence on the charging voltage. A light beam is projected onto this mirror from outside the high-voltage system and is reflected by it. The entire arrangement is adjusted in such a manner that, after a limit value of the charging voltage has been exceeded, the reflected light beam falls on a detector of the evaluating unit 11 which initiates the conversion into electric signals and their further processing.

In principle, such monitoring systems can be advantageously used wherever high-voltage capacitors are charged with direct voltage.

The principles, preferred embodiments and modes of operation of the present invention have been described in the foregoing specification. The invention which is intended to be protected herein, however, is not to be construed as being limited to the particular forms disclosed, since these are to be regarded as illustrative rather than restrictive. Variations and changes may be made by those skilled in the art without departing from the spirit of the invention.

I claim:

1. High-voltage direct-voltage source comprising
   a bank of high-voltage capacitors and
   a charging circuit which charges the bank and which includes an alternating-voltage supply source, a rectifying arrangement and a switching device which is connected in series with the bank, a monitoring unit which is connected in parallel with at least one of the high-voltage capacitors and which, after a predetermined limit-value of the charging voltage has been exceeded, emits a signal to a control device of the charging circuit preventing the further charging of the bank and which, in addition, has an input formed by a resistive voltage divider, comprising a high-voltage-side resistor and a low-voltage-side resistor, a limit-value detector being connected in parallel with the low-voltage-side resistor, which is coupled to an evaluating unit which is connected to the control device influencing the charging circuit, wherein the high-voltage-side resistor of the resistive voltage divider consists at least partially of non-linear voltage-dependent resistance material.

2. High-voltage direct-voltage source according to claim 1, wherein the limit-value detector emits a light signal which is converted into an electric signal in the evaluating unit which is at a lower potential.

3. High-voltage direct-voltage source as claimed in claim 2, wherein the light signal is conducted through an optical wave guide into the evaluating unit.

* * * * *